(12) United States Patent
Song

(10) Patent No.: US 11,198,382 B2
(45) Date of Patent: Dec. 14, 2021

(54) VARIABLE HANDLE DEVICE FOR GETTING ON AND OFF A VEHICLE

(71) Applicants: Hyundai Motor Company, Seoul (KR); Kia Motors Corporation, Seoul (KR)

(72) Inventor: Soon Yong Song, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/038,663

(22) Filed: Sep. 30, 2020

(65) Prior Publication Data

US 2021/0162905 A1 Jun. 3, 2021

(30) Foreign Application Priority Data

Dec. 2, 2019 (KR) ........................ 10-2019-0158120

(51) Int. Cl.
*B60N 3/02* (2006.01)

(52) U.S. Cl.
CPC ............. *B60N 3/023* (2013.01); *B60N 3/026* (2013.01)

(58) Field of Classification Search
CPC ................. B60N 3/023; B60N 3/026
USPC ....................................... 296/1.02
See application file for complete search history.

(56) References Cited

U.S. PATENT DOCUMENTS

| | | | | |
|---|---|---|---|---|
| 6,974,134 B1* | 12/2005 | Macri | ................... | B60N 3/023 16/412 |
| 8,613,475 B1* | 12/2013 | Statz | ...................... | B60R 3/007 296/1.02 |
| 11,046,226 B1* | 6/2021 | Younce | ..................... | B60P 3/36 |
| 2007/0204437 A1* | 9/2007 | Hartmann, Jr. | ...... | B60Q 1/2669 16/444 |
| 2009/0322052 A1* | 12/2009 | Ruehl | ....................... | B60R 3/00 280/166 |
| 2012/0222269 A1* | 9/2012 | Anderson | .............. | B60N 3/026 16/422 |
| 2017/0182919 A1* | 6/2017 | McKinnon | ............. | B60N 3/026 |
| 2020/0269739 A1* | 8/2020 | Bacon | .................... | B60N 3/023 |
| 2020/0406802 A1* | 12/2020 | Shitara | ................... | B62D 31/00 |
| 2021/0197701 A1* | 7/2021 | Sakurai | .................. | B60N 3/023 |

* cited by examiner

*Primary Examiner* — Jason S Morrow
(74) *Attorney, Agent, or Firm* — Slater Matsil, LLP

(57) ABSTRACT

A variable handle device for getting on and off a vehicle includes a grip body assembly installed to a vehicle body of a vehicle, the grip body assembly configured to be rotated and protruded to an outside of the vehicle body when a door is opened and to be pushed by the door to return to an inside of the vehicle body when the door is closed, a grip body rotation mechanism configured to generate a driving force for rotating the grip body assembly to the outside of the vehicle body when the grip body assembly returns to the inside of the vehicle body, and a grip handle assembled slidably to an outside surface of the grip body assembly along the grip body assembly.

20 Claims, 11 Drawing Sheets

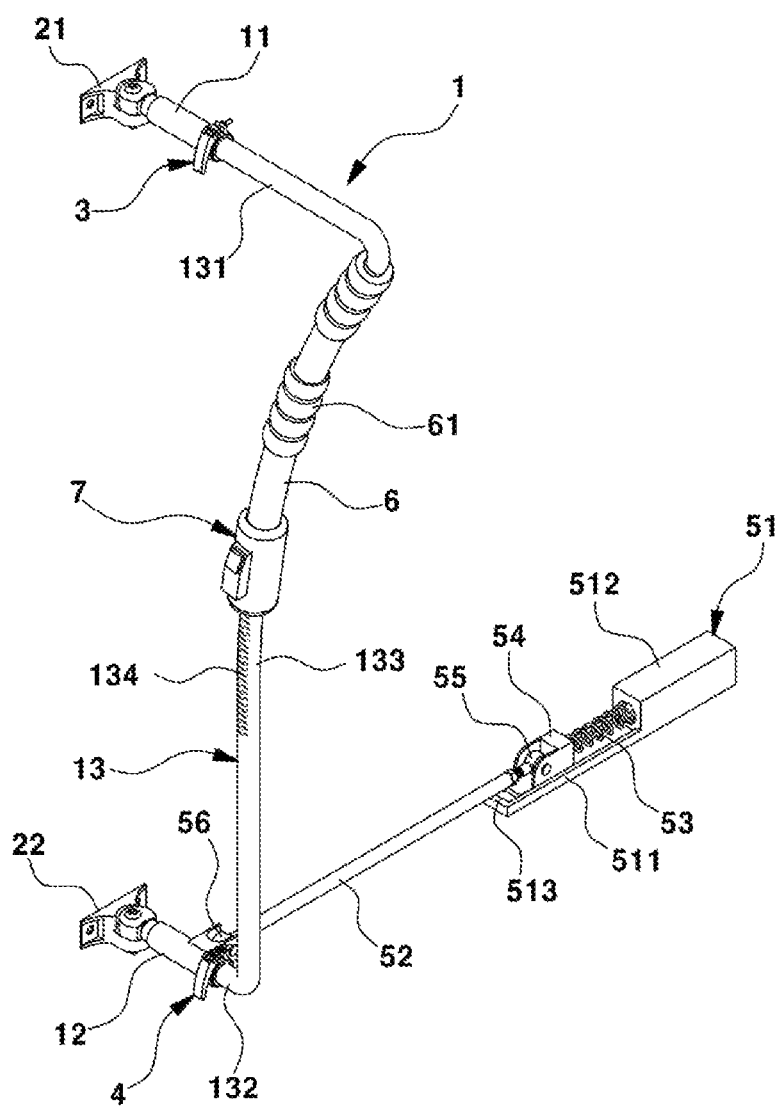
[FIG. 1]

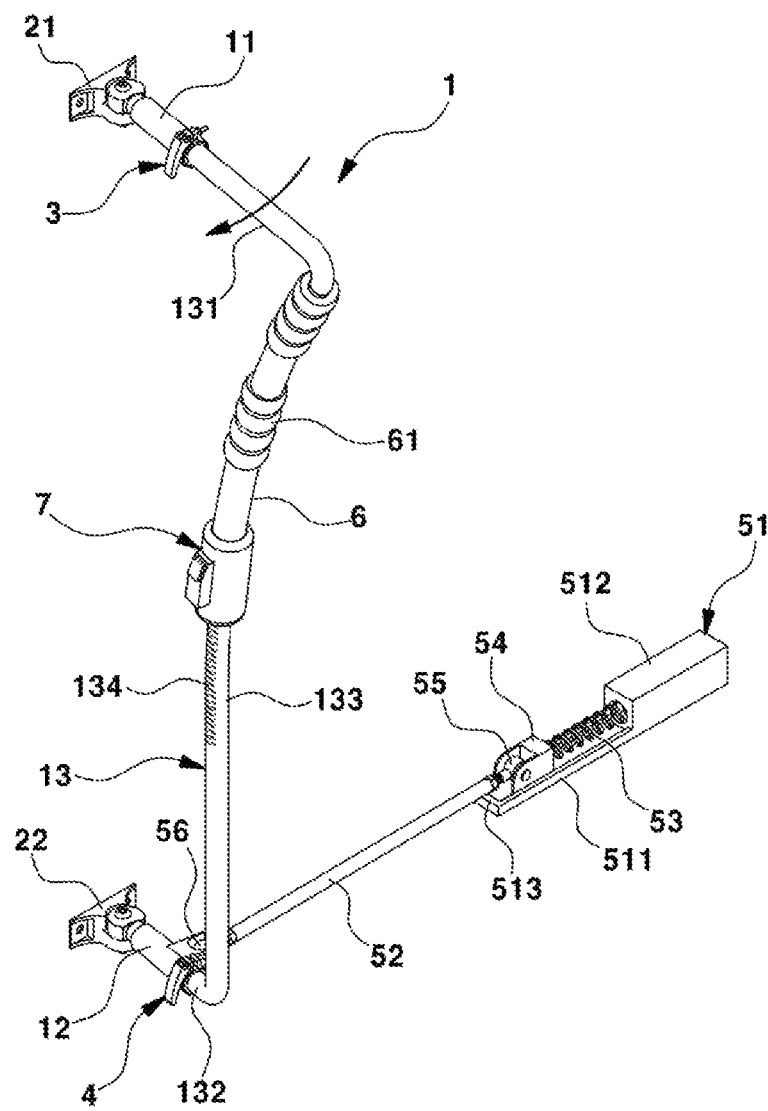
[FIG. 2]

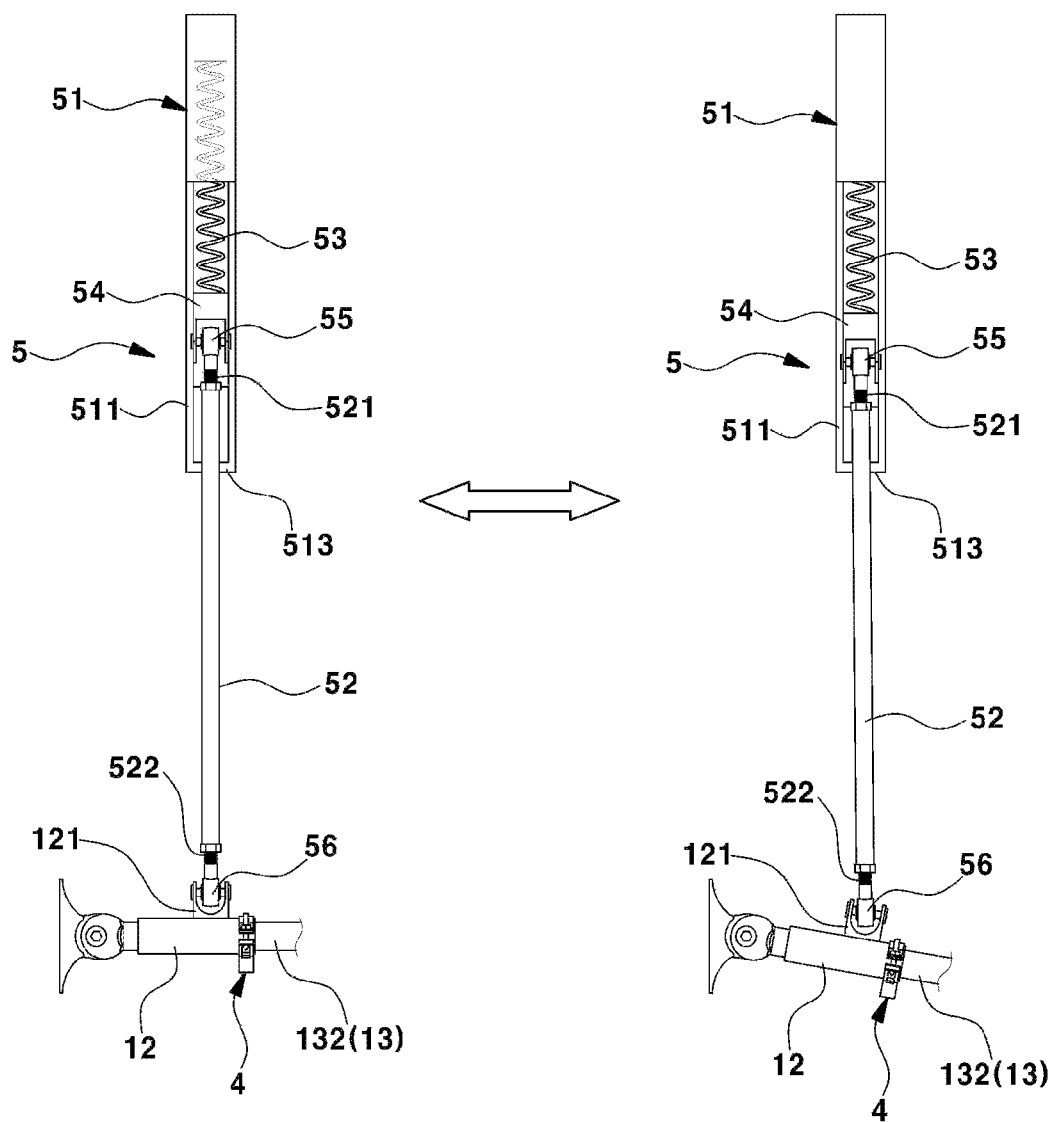
[FIG. 3]

[FIG. 4]
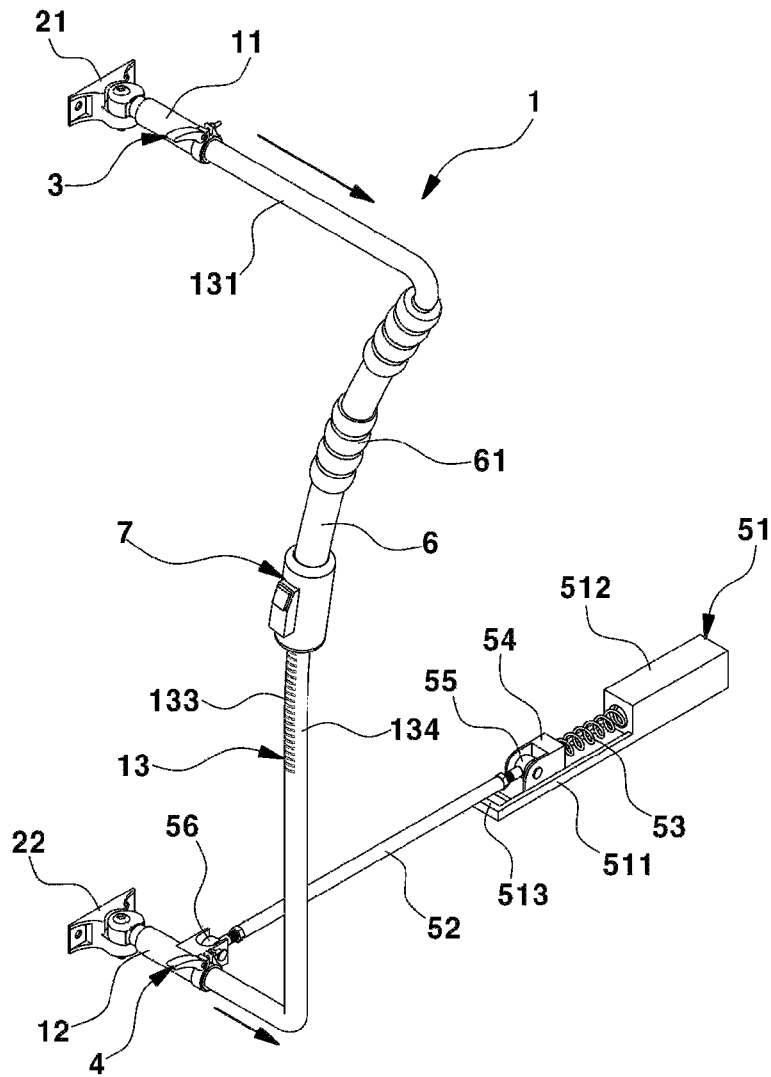
[FIG. 5]
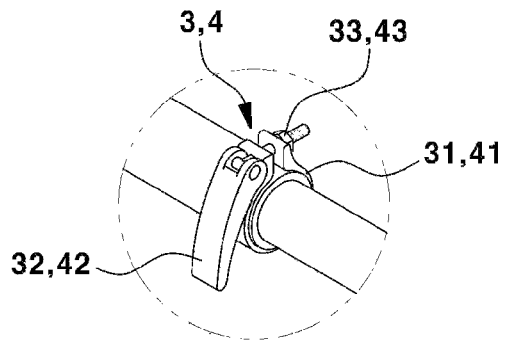

[FIG. 6]
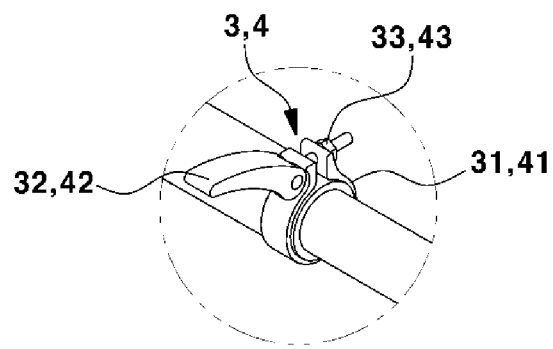
[FIG. 7]
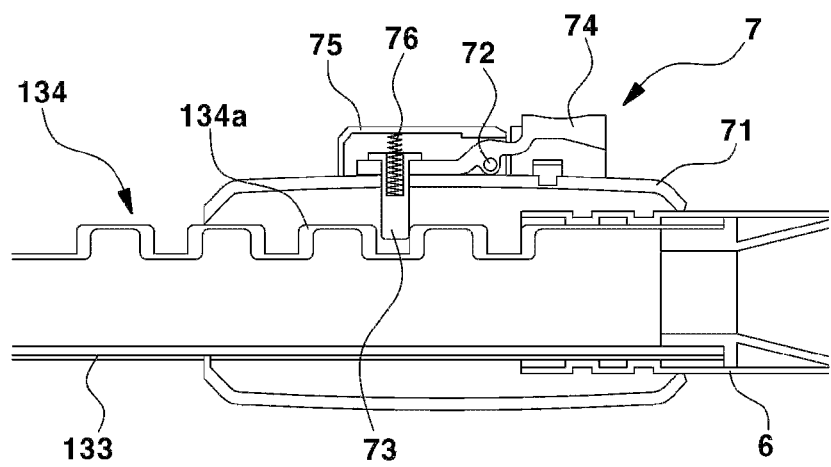

[FIG. 8]
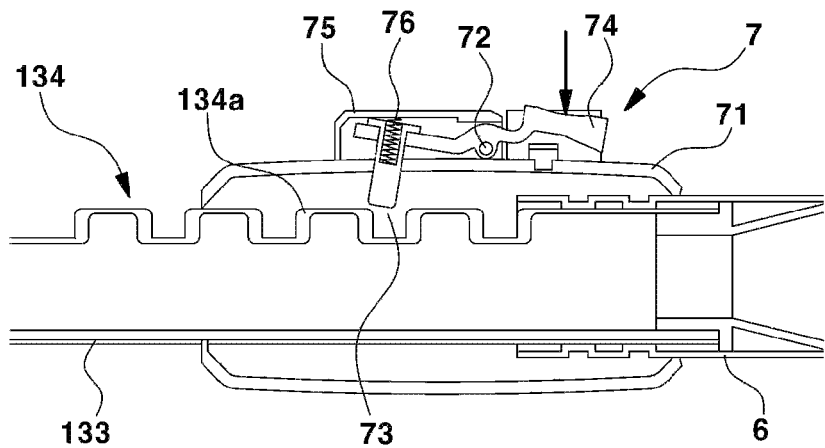
[FIG. 9]
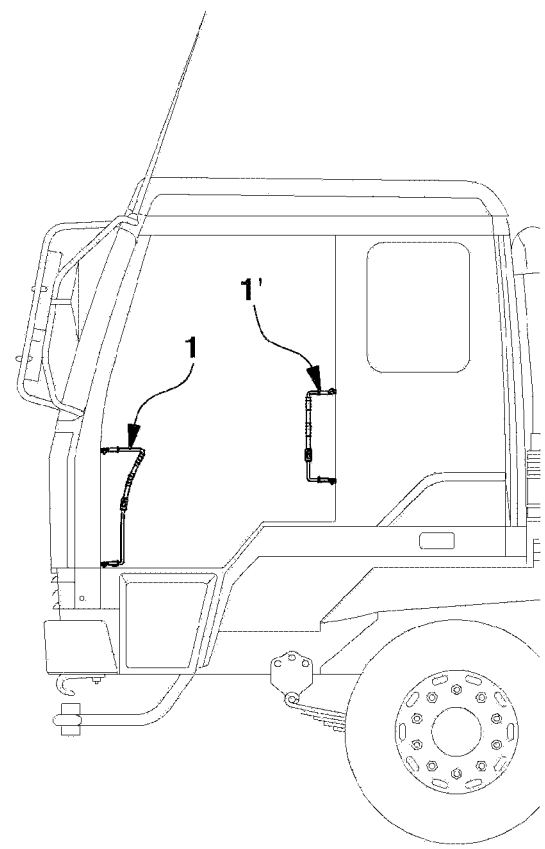

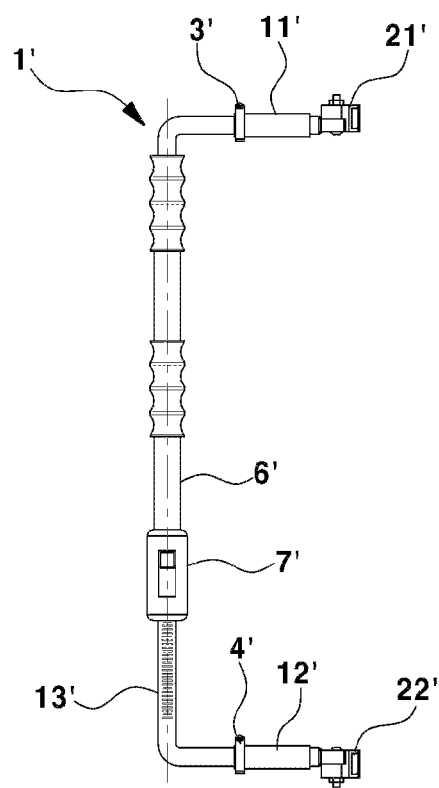
[FIG. 10]

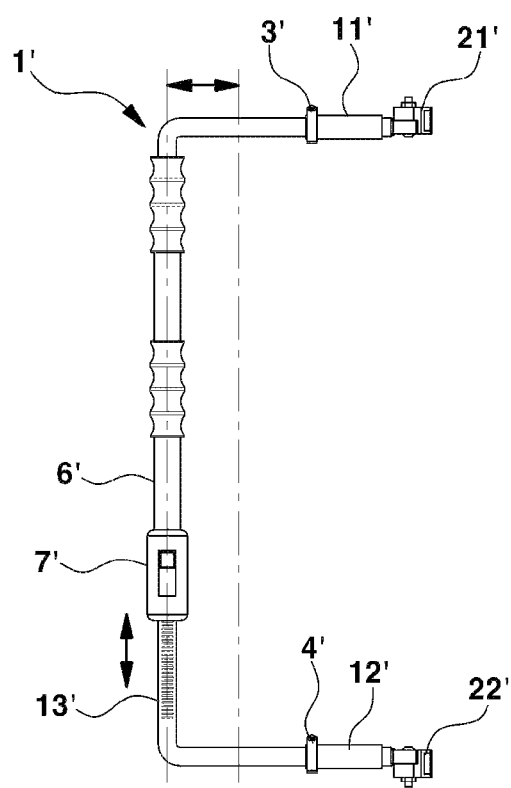
[FIG. 11]

[FIG. 12]
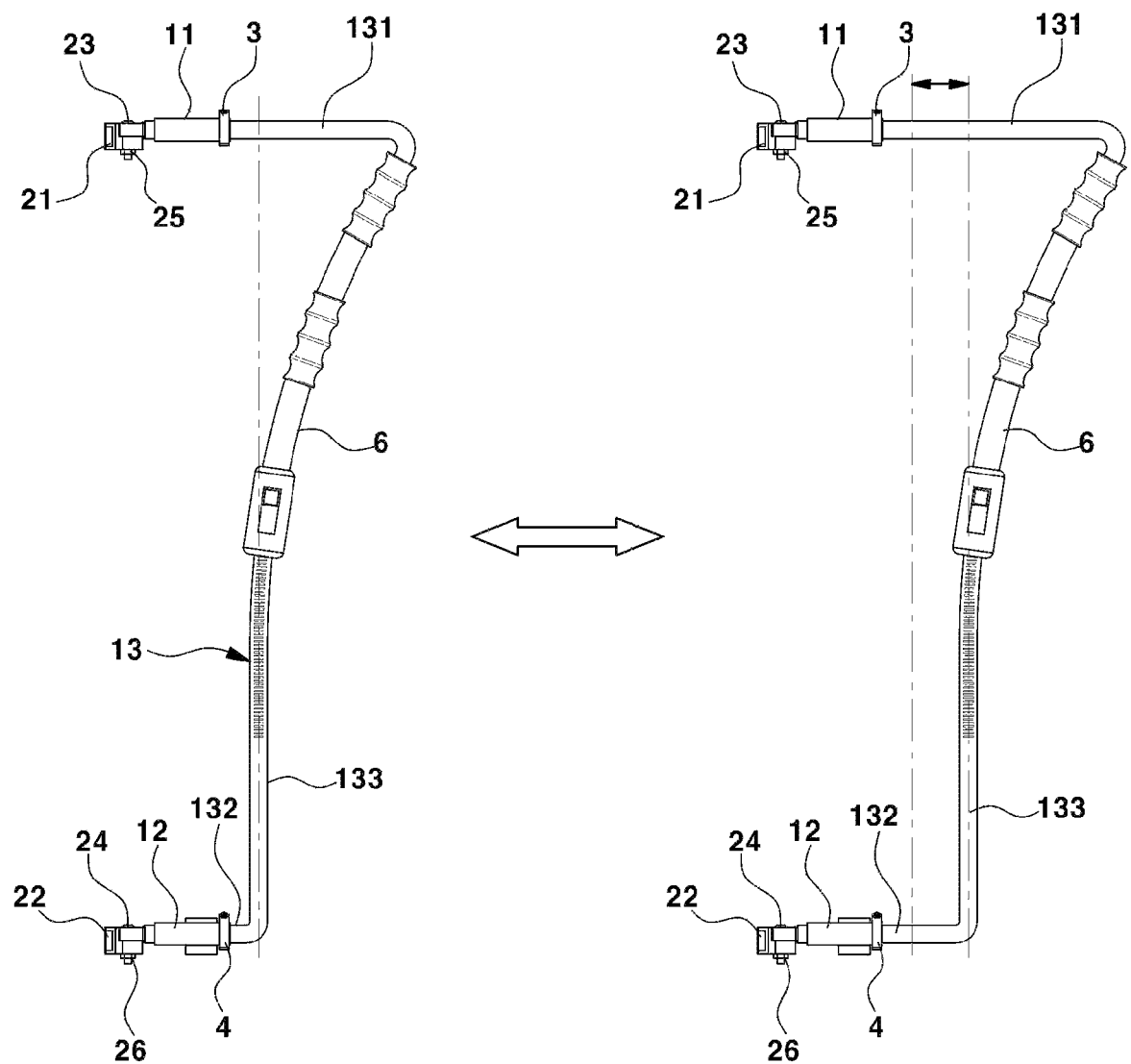

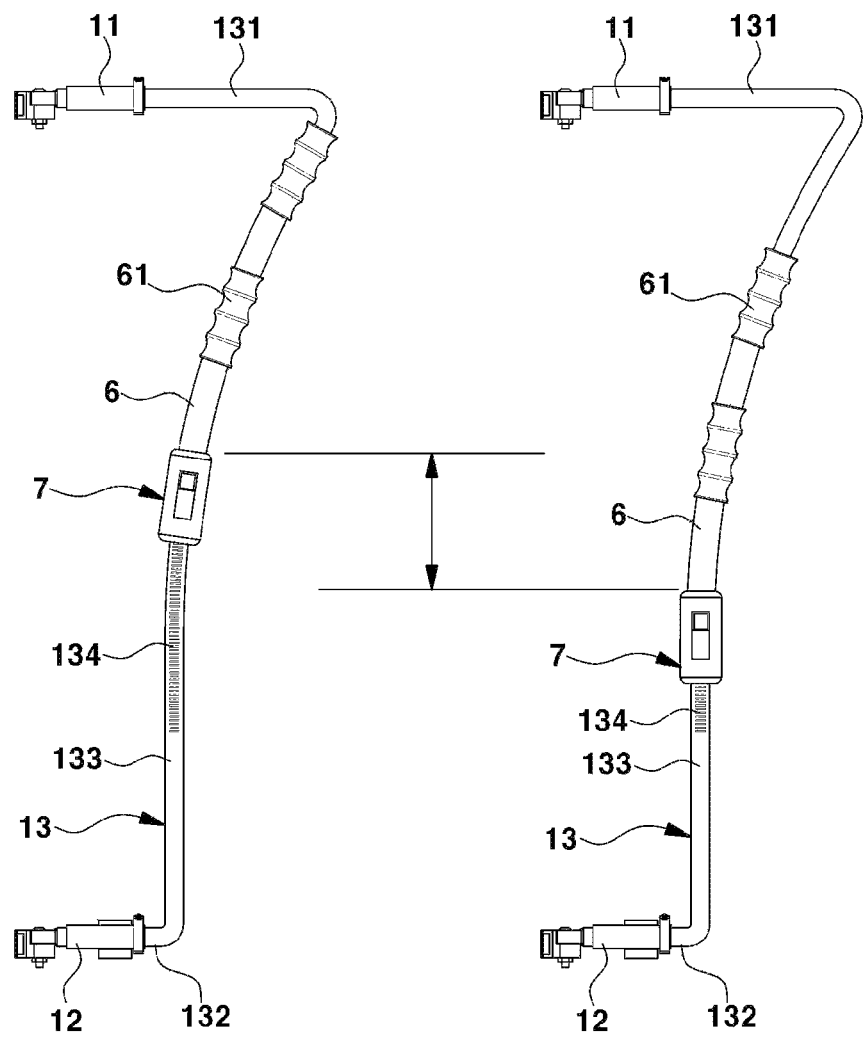
[FIG. 13]

[FIG. 14]
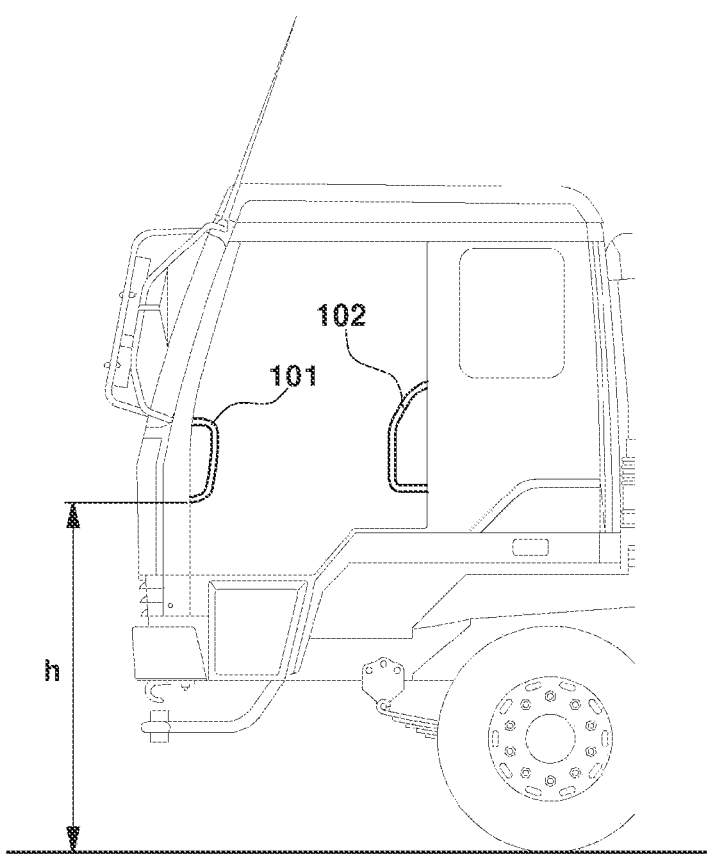
[PRIOR ART]

VARIABLE HANDLE DEVICE FOR GETTING ON AND OFF A VEHICLE

CROSS-REFERENCE TO RELATED APPLICATIONS

This application claims priority to Korean Patent Application No. 10-2019-0158120, filed on Dec. 2, 2019, which application is hereby incorporated herein by reference.

TECHNICAL FIELD

The present disclosure relates to a variable handle device for getting on and off a vehicle.

BACKGROUND

In general, a truck has a handle that a user may use when getting on and off the truck. The handle is provided at the vehicle body as a doorway for the user getting on and off that is disposed relatively high.

A conventional truck handle is provided in a state fixed to the vehicle body, and is disposed in a front pillar and a center pillar of the vehicle body or only in the center pillar thereof according to the type of the truck.

Referring to FIG. 14, the conventional truck handles 101, 102 are provided in a certain size at a predetermined position of the vehicle body. Therefore, it is impossible to change the vertical length, height, position, and the like of the truck handle considering physical conditions of the user such as height and arm length, and therefore, there exist problems in that the user who gets on and off the truck feels inconvenient, and the posture of the user getting on and off becomes unstable, thereby lowering the safety.

Although the distance (h) between the lower ends of the truck handles 101, 102 and the ground is limited by law, there are limitations to using the truck handles 101, 102 for user customization because of different physical conditions for each user.

The above information disclosed in this Background section is only for enhancement of understanding of the background of the disclosure and accordingly it may contain information that does not form the prior art that is already known in this country to a person of ordinary skill in the art.

SUMMARY

The present disclosure relates to a variable handle device for getting on and off a vehicle. Particular embodiments relate to a variable handle device for enhancing the convenience and safety of a user getting on and off a truck.

The present disclosure is intended to solve problems in the prior art. An embodiment of the present disclosure provides a variable handle device for getting on and off a truck, which may allow a user to get on and off more conveniently and safely regardless of physical conditions.

Therefore, embodiments of the present disclosure provide a variable handle device for getting on and off a truck configured as follows.

The variable handle device for getting on and off a truck is configured to include a grip body assembly installed to a vehicle body of a truck to be rotated and protruded to the outside of the vehicle body when a door is opened and to be pushed by the door to return to the inside of the vehicle body when the door is closed, a grip body rotation assembly for generating a driving force for rotating the grip body assembly to the outside of the vehicle body when the grip body assembly returns to the inside of the vehicle body, and a grip handle assembled slidably to the outside surface of the grip body assembly along the grip body assembly.

Specifically, the grip body assembly may be configured to include an upper grip body having a pipe shape installed rotatably to the vehicle body, a lower grip body having a pipe shape mounted rotatably to the vehicle body to be disposed under the upper grip body, and a center grip body having a pipe shape disposed between the upper grip body and the lower grip body to be coupled detachably to the free end of the upper grip body and the free end of the lower grip body.

According to an embodiment of the present disclosure, an upper body part of the center grip body slidably overlaps the free end of the upper grip body, and the outside surface of the free end of the upper grip body is provided with an upper coupling mechanism for coupling the upper body part with the upper grip body.

Further, according to an embodiment of the present disclosure, a lower body part of the center grip body slidably overlaps the free end of the lower grip body, and the outside surface of the free end of the lower grip body is provided with a lower coupling mechanism for coupling the lower body part with the lower grip body.

Further, the grip handle is disposed slidably to the outside surface of the center body part of the center grip body, and the end portion of the grip handle is provided with a handle movement control mechanism for limiting the sliding of the grip handle to fix the grip handle to the center body part.

According to an embodiment of the present disclosure, the handle movement control mechanism may be configured to include a case having a rotary shaft disposed at the outside surface thereof to be attached to the end portion of the grip handle, a locking pin fixed by being engaged with a hold part provided on the outside surface of the center body part in a state of having passed through the case, a release button for separating from the hold part by pulling the locking pin while being rotated with respect to the rotary shaft, a housing provided on the outside surface of the case to surround the locking pin, and a spring member connected to the housing and the locking pin to press the locking pin to the hold part side.

Further, according to an embodiment of the present disclosure, the grip body rotation assembly may be configured to include a support having a rail to be mounted to the vehicle body, a rod having a first end portion connected rotatably to the rail and a second end portion connected slidably to the lower grip body, an elastic member installed to the support to press the first end portion, and a stopper disposed on the end portion of the rail to limit the movement of the rod by the elastic member.

The variable handle device for getting on and off the truck according to embodiments of the present disclosure may adjust the position of the grip handle to be customized for each user, thereby enhancing the convenience and safety of the user getting on and off the truck.

It is understood that the term "vehicle" or "vehicular" or other similar term as used herein is inclusive of motor vehicles in general such as passenger automobiles including sports utility vehicles (operation SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the disclosure are discussed herein.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 1 is a perspective diagram illustrating a variable handle device according to embodiments of the present disclosure.

FIG. 2 is a perspective diagram illustrating a state where a grip body assembly according to embodiments of the present disclosure has been pivoted.

FIG. 3 is a plane diagram illustrating a lower grip body pivoted by a grip body rotation assembly according to embodiments of the present disclosure.

FIG. 4 is a perspective diagram illustrating a state where the grip body assembly according to embodiments of the present disclosure has been extended in the front and rear directions of a vehicle.

FIGS. 5 and 6 are diagrams illustrating an upper coupling mechanism and a lower coupling mechanism according to embodiments of the present disclosure.

FIGS. 7 and 8 are diagrams illustrating a handle movement control mechanism according to embodiments of the present disclosure.

FIG. 9 is a diagram illustrating the grip body assembly installed to a vehicle body of a truck.

FIGS. 10 and 11 are diagrams illustrating a grip body assembly according to another embodiment of the present disclosure.

FIGS. 12 and 13 are front diagrams illustrating operation states of the grip body assembly according to embodiments of the present disclosure.

FIG. 14 is a diagram illustrating a conventional truck handle.

It should be understood that the appended drawings are not necessarily to scale, presenting a somewhat simplified representation of various preferred features illustrative of the basic principles of the disclosure. The specific design features of embodiments of the present disclosure as disclosed herein, including, for example, specific dimensions, orientations, locations, and shapes will be determined by the particular intended application and use environment.

In the figures, reference numbers refer to the same or equivalent sections of the present disclosure throughout the several figures of the drawings.

DETAILED DESCRIPTION OF ILLUSTRATIVE EMBODIMENTS

Hereinafter, the present disclosure will be described to be easily implemented by those skilled in the art.

A variable handle device according to embodiments of the present disclosure is configured to be conveniently and safely used by multiple users when getting on and off a vehicle regardless of their physical conditions.

As illustrated in FIGS. 1 to 4, the variable handle device is configured to include a grip body assembly 1, a grip body rotation assembly 5, and a grip handle 6.

Referring to FIG. 9, the grip body assembly 1 is installed to a vehicle body of a truck. Specifically, the grip body assembly 1 is provided in a doorway side vehicle body panel that is opened and closed by the door. The grip body assembly 1 is coupled rotatably to the vehicle body, is rotated and protruded to the outside of the vehicle body when the door is opened, and is pushed by the door to be rotated and returned to the inside of the vehicle body when the door is closed.

The grip body assembly 1 is rotated to the outside of the vehicle body by a driving force (elastic restoring force) provided by the grip body rotation assembly 5 when the door is opened, and is pushed by the door when the door is closed to operate the grip body rotation assembly 5 so that the grip body rotation assembly 5 may generate the driving force (elastic restoring force).

That is, the grip body rotation assembly 5 may generate a driving force for rotating the grip body assembly 1 when the grip body assembly 1 is rotated and returned to the inside of the vehicle body.

The grip body assembly 1 is configured to include an upper grip body 11, a lower grip body 12, and a center grip body 13.

The upper grip body 11 may be formed in a straight type pipe shape and may be disposed to extend in the front and rear directions of the vehicle body. A first end portion of the upper grip body 11 is installed rotatably to the vehicle body, and the second end portion of the upper grip body 11 becomes a free end.

The lower grip body 12 may be formed in a straight type pipe shape and may be disposed to extend in the front and rear directions of the vehicle body. A first end portion of the lower grip body 12 is installed rotatably to the vehicle body, and a second end portion of the lower grip body 12 becomes a free end. The lower grip body 12 is disposed under the upper grip body 11 at a certain interval.

The first end portion of the upper grip body 11 and the first end portion of the lower grip body 12 may be coupled rotatably to the bracket members 21, 22 fixed to the vehicle body, and may be connected rotatably to the bracket members 21, 22 via pin members 23, 24. Nut members 25, 26 are fastened to the lower portions of the pin members 23, 24 having passed through the first end portion and the bracket members 21, 22 (see FIG. 12).

The nut members 25, 26 may minimize the occurrence of friction due to the contact with the bracket members 21, 22 when the upper grip body 11 and the lower grip body 12 are rotated in the case of being made of a nylon material, and may prevent them from being released from the pin members 23, 24 due to the occurrence of friction.

The center grip body 13 may be formed in a pipe shape having a substantially ⊏ shape. The center grip body 13 may be composed of an upper body part 131 coupled to the free end of the upper grip body 11, a lower body part 132 coupled to the free end of the lower grip body 12, and a center body part 133 formed integrally between the upper body part 131 and the lower body part 132.

The upper body part 131 may be formed in a straight type pipe shape and may be formed to have the outer diameter smaller than the inner diameter of the upper grip body 11. The lower body part 132 may be formed in a straight type pipe shape and may be formed to have the outer diameter smaller than the inner diameter of the lower grip body 12.

The center body part 133 may be formed of a curve-shaped portion connected with the upper body part 131 and a straight-shaped portion connected with the lower body part 132. A grip handle 6 may be disposed on the curve-shaped portion of the center body part 133.

The center grip body 13 is disposed between the upper grip body 11 and the lower grip body 12, and at this time, the upper body part 131 is coupled to the free end of the upper grip body 11 to be accessible, and the lower body part 132 is coupled to the free end of the lower grip body 12 to be accessible.

To this end, the upper body part 131 may be slidably inserted into the free end of the upper grip body 11 to overlap the free end of the upper grip body 11, and the lower body part 132 may be slidably inserted into the free end of the lower grip body 12 to overlap the free end of the lower grip body 12.

Therefore, it is possible to adjust the length of the section where the upper body part 131 and the free end of the upper grip body 11 overlap and the length of the section where the lower body part 132 and the free end of the lower grip body 12 overlap, thereby increasing or decreasing the horizontal width of the grip body assembly 1.

After adjusting the horizontal width of the grip body assembly 1, the upper grip body 11 and the upper body part 131 are coupled, and the lower grip body 12 and the lower body pail 132 are coupled. To this end, an upper coupling mechanism 3 is provided on the outside surface of the free end of the upper grip body 11, and a lower coupling mechanism 4 is provided on the outside surface of the free end of the lower grip body 12.

The upper coupling mechanism 3 is configured by pressing the free end of the upper grip body 11 having overlapped the upper body pail 131 to the upper body part 131 side to couple the upper body part 131 with the free end of the upper grip body 11.

The lower coupling mechanism 4 is configured by pressing the free end of the lower grip body 12 having overlapped the lower body pall 132 to the lower body pall 132 side to couple the lower body part 132 with the free end of the lower grip body 12.

As illustrated in FIGS. 5 and 6, the upper coupling mechanism 3 may be configured to include an upper band member 31, an upper tightening member 32, and an upper fixing member 33.

The upper band member 31 is disposed on the outside surface of the free end of the upper grip body 11. The upper band member 31 is formed to surround the outside surface of the free end of the upper grip body 11 and is configured in a ring shape having one side in the circumferential direction opened.

The upper tightening member 32 is configured to tighten the upper band member 31. The upper tightening member 32 may tighten the upper band member 31 so that the free end of the upper grip body 11 having overlapped the upper body part 131 presses the upper body part 131.

The upper fixing member 33 is configured to lock the operation of the upper tightening member 32. Therefore, the upper fixing member 33 may maintain a state where the upper tightening member 32 has tightened the upper band member 31. The tightening of the upper tightening member 32 may be released in a state where the upper fixing member 33 has been unlocked.

As illustrated in FIGS. 5 and 6, the lower coupling mechanism 4 may be configured to include a lower band member 41, a lower tightening member 42, and a lower fixing member 43. The lower coupling mechanism 4 may be configured in the same operating structure as that of the upper coupling mechanism 3, except that the lower band member 41 is disposed on the outside surface of the free end of the lower grip body 12.

As illustrated in FIGS. 1 and 13, the grip handle 6 is assembled slidably to the outside surface of the grip body assembly 1 along the grip body assembly 1. Specifically, the grip handle 6 is disposed slidably to the outside surface of the center body part 133 in the longitudinal direction of the center body part 133.

The grip handle 6 is formed to have a shorter length than the center body part 133 and is formed to have the inner diameter larger than the outer diameter of the center body part 133.

The lower end portion of the grip handle 6 is provided with a handle movement control mechanism 7 capable of limiting the sliding of the grip handle 6. The handle movement control mechanism 7 is configured to fix the grip handle 6 to a predetermined position of the center body part 133.

As illustrated in FIGS. 7 and 8, the handle movement control mechanism 7 may be configured to include a case 71, a locking pin 73, a release button 74, and a spring member 76.

The case 71 may be formed in a cylindrical shape surrounding a portion of the center body part 133, and is attached to be fixed to the lower end portion of the grip handle 6 to be disposed on the outside surface of the center body part 133. At this time, the entire section of the case 71 overlaps a hold part 134 or a partial section of the case 71 overlaps the hold part 134.

The hold part 134 is provided at the lower portion (that is, a straight-shaped portion) of the center body part 133, and the hold part 134 may be composed of a plurality of protrusion type ribs 134a arranged in the longitudinal direction of the center body part 133.

Further, the outside surface of the case 71 is provided with a rotary shaft 72 for supporting the rotation of the locking pin 73 and a housing 75 for surrounding the rotary shaft 72.

The locking pin 73 may be fixed by being engaged with the hold part 134 of the center body part 133 in a state of having passed through one side of the case 71. When the end portion of the locking pin 73 is inserted between the ribs 134a, the case 71 is blocked from moving in the longitudinal direction of the hold part 134. As the movement of the case 71 is blocked, the grip handle 6 is fixed to a predetermined position of the center body part 133.

The release button 74 is mounted rotatably to the case 71 through the rotary shaft 72. The release button 74 may separate it from the hold part 134 by pulling the locking pin 73 while being rotated with respect to the rotary shaft 72.

The housing 75 is provided to be fixed to the outside surface of the case 71 and is configured to operably cover the locking pin 73 and the rotary shaft 72.

The spring member 76 is provided between the housing 75 and the locking pin 73 to elastically press the locking pin 73 to the hold part 134 side. Both side end portions of the spring member 76 are connected to and fixed to the housing 75 and the locking pin 73, respectively.

When the locking pin 73 is separated from the hold part 134, the spring member 76 is pressed and compressed to the housing 75 side. The spring member 76 generates a driving force (elastic restoring force) for returning the locking pin 73 while being compressed.

The grip handle 6 may be made of a material that may be flexibly bent or may be configured to have a certain gap with the center body part 133 in order to be able to slide normally in the section of the curve-shaped portion of the center body part 133.

As illustrated in FIGS. 1 to 4, the grip body rotation assembly 5 may be configured to include a support 51, a rod 52, an elastic member 53, and a stopper 513.

The support 51 is mounted to be fixed to the bottom portion of the vehicle body. The support 51 is provided with a rail 511 for supporting the sliding of the rod 52 and a support block 512 for supporting one side end portion of the elastic member 53.

The rod 52 has a first end portion 521 having a first joint unit 55 and a second end portion 522 having a second joint unit 56. The first end portion 521 is installed slidably to the rail 511 through a moving bracket 54 and the first joint unit 55, and the second end portion 522 is connected rotatably to the bracket 121 of the lower grip body 12 through the second joint unit 56.

The second joint unit 56 is assembled rotatably to the bracket 121 of the lower grip body 12 to maintain a state where the second end portion 522 of the rod 52 has been connected to the bracket 121 when the rod 52 is pushed by the elastic member 53 to pivot the lower grip body 12 to the outside of the vehicle body. To this end, a certain gap may be formed between the second joint unit 56 and the rotary shaft of the bracket 121.

The first joint unit 55 may be configured to have the same structure as that of the second joint unit 56, except that it is mounted to the moving bracket 54 instead of the bracket 121. The moving bracket 54 is configured to slide along the rail 511 to be linearly moved.

Both side end portions of the elastic member 53 may be connected to be fixed to the support block 512 and the moving bracket 54, respectively. The elastic member 53 may move the first end portion 521 of the rod 52 along the rail 511 by pressing the moving bracket 54. That is, the elastic member 53 may be installed to the support 51 to press the first end portion 521 of the rod 52.

The stopper 513 may be formed integrally on the end portion of the rail 511 to be disposed on the end portion of the rail 511. The stopper 513 may stop the sliding of the moving bracket 54 sliding along the rail 511 to limit the movement of the first end portion 521 of the rod 52 in the left and right directions of the vehicle body.

It is possible to limit the movement of the rod 52 by the stopper 513, thereby limiting the rotational angle and the protrusion amount of the grip body assembly 1 including the lower grip body 12. It is possible to limit the protrusion amount that the grip body assembly 1 is protruded to the outside of the vehicle body, thereby providing a continuous sense of stability when the user gets on and off while gripping the grip handle 6.

As illustrated in FIG. 1, a non-slip grip part 61 made of a silicon material may be further provided on the outside surface of the grip handle 6. The non-slip grip part 61 may suppress the user's hand from slipping and enhance the user's grip sense.

Further, the non-slip grip part 61 may have a protrusion shape for preventing slipping considering the user's finger spacing.

Meanwhile, as illustrated in FIG. 9, the grip body assembly 1 may be disposed at the front of the doorway when being installed to the vehicle body panel and a grip body assembly 1' may also be installed at the rear of the doorway.

The grip body assembly 1' may also be configured to have the same structure as the grip body assembly 1 described above, but may be configured to have a structure having omitted the grip body rotation assembly 5 for pivoting the grip body assembly 1.

As illustrated in FIGS. 10 and 11, the grip body assembly 1' may be configured to include an upper grip body 11' and a lower grip body 12' fixed to the vehicle body, and a center grip body 13' coupled slidably to the free ends of the upper grip body if and the lower grip body 12'.

The upper grip body if and the lower grip body 12' may be fixed to the vehicle body through bracket members 21', 22'. A grip handle 6', which may be moved by a handle movement control mechanism 7', is disposed at the outside of the center grip body 13'.

An upper coupling mechanism 3' may be provided on the outside surface of the free end of the upper grip body if, and a lower coupling mechanism 4' may be provided on the outside surface of the free end of the lower grip body 12'. Further, the center body part of the center grip body 13' may be formed in a straight shape.

Here, the operation state of the variable handle device configured as described above will be described as an example as follows.

As illustrated in FIGS. 2 and 3, if the truck door is opened, the grip body assembly 1 is protruded to the outside of the vehicle body while being pivoted by the grip body rotation assembly 5 at a certain angle.

If the truck door is opened, the lower grip body 12 is pivoted while the elastic member 53 of the grip body rotation assembly 5 is restored, and the center grip body 13 coupled to the lower grip body 12 and the grip handle 6 is also rotated to the outside of the vehicle body.

Further, referring to FIGS. 4 and 12, the upper body part 131 and the lower body part 132 of the center grip body 13 may be further protruded to the outsides of the upper grip body 11 and the lower grip body 12 in a state of having released the locking by the upper coupling mechanism 3 and the lower coupling mechanism 4. Therefore, the position of the grip handle 6 may be moved in the front and rear directions of the vehicle.

Further, referring to FIG. 13, the position of the grip handle 6 may be moved in the vertical direction along the center grip body 13 in a state of having released the locking of the handle movement control mechanism 7.

As described above, it is possible to adjust the position of the grip handle 6 to allow the user to grip the grip handle 6 in more optimized conditions when getting on and off a vehicle, and as a result, the user may get on and off a truck more conveniently and stably.

As described above, although the embodiments of the present disclosure have been described in detail, the scope of the present disclosure is not limited to the above-described embodiments, and various modifications and improvements of those skilled in the art using the basic concept of the present disclosure defined in the following claims are also included in the scope of the present disclosure.

What is claimed is:

1. A variable handle device for getting on and off a vehicle, the variable handle device comprising:
   a grip body assembly installed to a vehicle body of a vehicle, the grip body assembly configured to be rotated and protruded to an outside of the vehicle body when a door is opened and to be pushed by the door to return to an inside of the vehicle body when the door is closed;
   a grip body rotation assembly configured to generate a driving force for rotating the grip body assembly to the outside of the vehicle body when the grip body assembly returns to the inside of the vehicle body; and
a grip handle assembled slidably to an outside surface of the grip body assembly along the grip body assembly.

2. The variable handle device of claim 1, wherein the grip body assembly comprises:
an upper grip body having a pipe shape installed rotatably to the vehicle body;
a lower grip body having a pipe shape mounted rotatably to the vehicle body and disposed under the upper grip body; and
a center grip body having a pipe shape disposed between the upper grip body and the lower grip body and coupled detachably to a free end of the upper grip body and a free end of the lower grip body.

3. The variable handle device of claim 2, wherein:
an upper body part of the center grip body slidably overlaps the free end of the upper grip body; and
an outside surface of the free end of the upper grip body is provided with an upper coupling mechanism for coupling the upper body part with the upper grip body.

4. The variable handle device of claim 2, wherein:
a lower body part of the center grip body slidably overlaps the free end of the lower grip body; and
an outside surface of the free end of the lower grip body is provided with a lower coupling mechanism for coupling the lower body part with the lower grip body.

5. The variable handle device of claim 2, wherein:
the grip handle is disposed slidably to an outside surface of a center body part of the center grip body; and
an end portion of the grip handle is provided with a handle movement control mechanism for limiting sliding of the grip handle to fix the grip handle to the center body part.

6. The variable handle device of claim 5, wherein the handle movement control mechanism comprises:
a case having a rotary shaft disposed at an outside surface of the case and attached to the end portion of the grip handle;
a locking pin fixed by being engaged with a hold part provided on the outside surface of the center body part in a state of having passed through the case; and
a release button configured to separate from the hold part by pulling the locking pin while being rotated with respect to the rotary shaft.

7. The variable handle device of claim 6 wherein the handle movement control mechanism comprises:
a housing provided on the outside surface of the case to surround the locking pin; and
a spring member connected to the housing and the locking pin to press the locking pin to a side of the hold part.

8. The variable handle device of claim 2, wherein the grip body rotation assembly comprises:
a support having a rail mounted to the vehicle body;
a rod having a first end portion connected slidably to the rail and a second end portion connected rotatably to the lower grip body; and
an elastic member installed to the support and configured to press the first end portion.

9. The variable handle device of claim 8, wherein the grip body rotation assembly comprises a stopper disposed on an end portion of the rail to limit movement of the rod by the elastic member.

10. The variable handle device of claim 1, wherein an outside surface of the grip handle is further provided with a non-slip grip part made of a silicon material.

11. A variable handle device for getting on and off a vehicle, the variable handle device comprising:
a grip body assembly installed to a vehicle body of a vehicle, the grip body assembly configured to be rotated and protruded to an outside of the vehicle body when a door is opened and to be pushed by the door to return to an inside of the vehicle body when the door is closed;
a grip body rotation assembly configured to generate a driving force for rotating the grip body assembly to the outside of the vehicle body when the grip body assembly returns to the inside of the vehicle body; and
a grip handle assembled slidably to an outside surface of the grip body assembly along the grip body assembly;
wherein the grip body assembly comprises:
an upper grip body having a pipe shape installed rotatably to the vehicle body;
the lower grip body having a pipe shape mounted rotatably to the vehicle body and disposed under the upper grip body; and
a center grip body having a pipe shape disposed between the upper grip body and the lower grip body and coupled detachably to a free end of the upper grip body and a free end of the lower grip body; and
wherein the grip body rotation assembly comprises:
a support having a rail mounted to the vehicle body;
a rod having a first end portion connected slidably to the rail and a second end portion connected rotatably to a lower grip body of the grip body assembly; and
an elastic member installed to the support and configured to press the first end portion.

12. The variable handle device of claim 11, wherein:
an upper body part of the center grip body slidably overlaps the free end of the upper grip body; and
an outside surface of the free end of the upper grip body is provided with an upper coupling mechanism for coupling the upper body part with the upper grip body.

13. The variable handle device of claim 11, wherein:
a lower body part of the center grip body slidably overlaps the free end of the lower grip body; and
an outside surface of the free end of the lower grip body is provided with a lower coupling mechanism for coupling the lower body part with the lower grip body.

14. The variable handle device of claim 11, wherein:
the grip handle is disposed slidably to an outside surface of a center body part of the center grip body; and
an end portion of the grip handle is provided with a handle movement control device for limiting sliding of the grip handle to fix the grip handle to the center body part, the handle movement control device comprising:
a case having a rotary shaft disposed at an outside surface of the case and attached to the end portion of the grip handle;
a locking pin fixed by being engaged with a hold part provided on the outside surface of the center body part in a state of having passed through the case;
a release button configured to separate from the hold part by pulling the locking pin while being rotated with respect to the rotary shaft;
a housing provided on the outside surface of the case to surround the locking pin; and
a spring member connected to the housing and the locking pin to press the locking pin to a side of the hold part.

15. The variable handle device of claim 11, wherein the grip body rotation assembly further comprises a stopper disposed on an end portion of the rail to limit movement of the rod by the elastic member.

16. The variable handle device of claim 11, wherein an outside surface of the grip handle is further provided with a non-slip grip part made of a silicon material.

17. A vehicle comprising:
a vehicle body;
a vehicle door; and
a variable handle device comprising:
- an upper grip body having a pipe shape installed rotatably to the vehicle body;
- a lower grip body having a pipe shape mounted rotatably to the vehicle body and disposed under the upper grip body; and
- a center grip body having a pipe shape disposed between the upper grip body and the lower grip body and coupled detachably to a free end of the upper grip body and a free end of the lower grip body;
- a support having a rail mounted to the vehicle body;
- a rod having a first end portion connected slidably to the rail and a second end portion connected rotatably to the lower grip body;
- an elastic member installed to the support and configured to press the first end portion; and
- a grip handle disposed slidably to an outside surface of a center body part of the center grip body.

18. The vehicle of claim 17, wherein:
an upper body part of the center grip body slidably overlaps the free end of the upper grip body;
an outside surface of the free end of the upper grip body is provided with an upper coupling mechanism for coupling the upper body part with the upper grip body;
a lower body part of the center grip body slidably overlaps the free end of the lower grip body; and
an outside surface of the free end of the lower grip body is provided with a lower coupling mechanism for coupling the lower body part with the lower grip body.

19. The vehicle of claim 17, further comprising:
a case having a rotary shaft disposed at an outside surface of the case and attached to the end portion of the grip handle;
a locking pin fixed by being engaged with a hold part provided on the outside surface of the center body part in a state of having passed through the case;
a release button configured to separate from the hold part by pulling the locking pin while being rotated with respect to the rotary shaft;
a housing provided on the outside surface of the case to surround the locking pin; and
a spring member connected to the housing and the locking pin to press the locking pin to a side of the hold part.

20. The vehicle of claim 17, wherein the vehicle is a truck.

* * * * *